No. 763,141. PATENTED JUNE 21, 1904.
H. M. BARNGROVER.
CHAIN BUCKET ELEVATOR.
APPLICATION FILED FEB. 3, 1904.
NO MODEL. 2 SHEETS—SHEET 1.

Witnesses:— Inventor,
F. C. Fliedner Harvey M. Barngrover
By Geo. H. Strong.
Atty.

No. 763,141. PATENTED JUNE 21, 1904.
H. M. BARNGROVER.
CHAIN BUCKET ELEVATOR.
APPLICATION FILED FEB. 3, 1904.
NO MODEL. 2 SHEETS—SHEET 2.

Witnesses:
F. C. Fliedner

Inventor,
Harvey M. Barngrover
By Geo. H. Strong
Atty

No. 763,141. Patented June 21, 1904.

UNITED STATES PATENT OFFICE.

HARVEY M. BARNGROVER, OF SAN JOSE, CALIFORNIA, ASSIGNOR TO ANDERSON, BARNGROVER MANUFACTURING CO., OF SAN JOSE, CALIFORNIA, A CORPORATION.

CHAIN BUCKET ELEVATOR.

SPECIFICATION forming part of Letters Patent No. 763,141, dated June 21, 1904.

Application filed February 3, 1904. Serial No. 191,845. (No model.)

*To all whom it may concern:*

Be it known that I, HARVEY M. BARNGROVER, a citizen of the United States, residing at San Jose, in the county of Santa Clara and State of California, have invented new and useful Improvements in Chain Bucket Elevators, of which the following is a specification.

My invention relates to an apparatus for elevating substances such as prunes, dried fruit, or any substance which can be transmitted by the use of such a device.

My invention consists of the parts and the constructions and combinations of parts, which I will hereinafter describe and claim.

Figure 1:
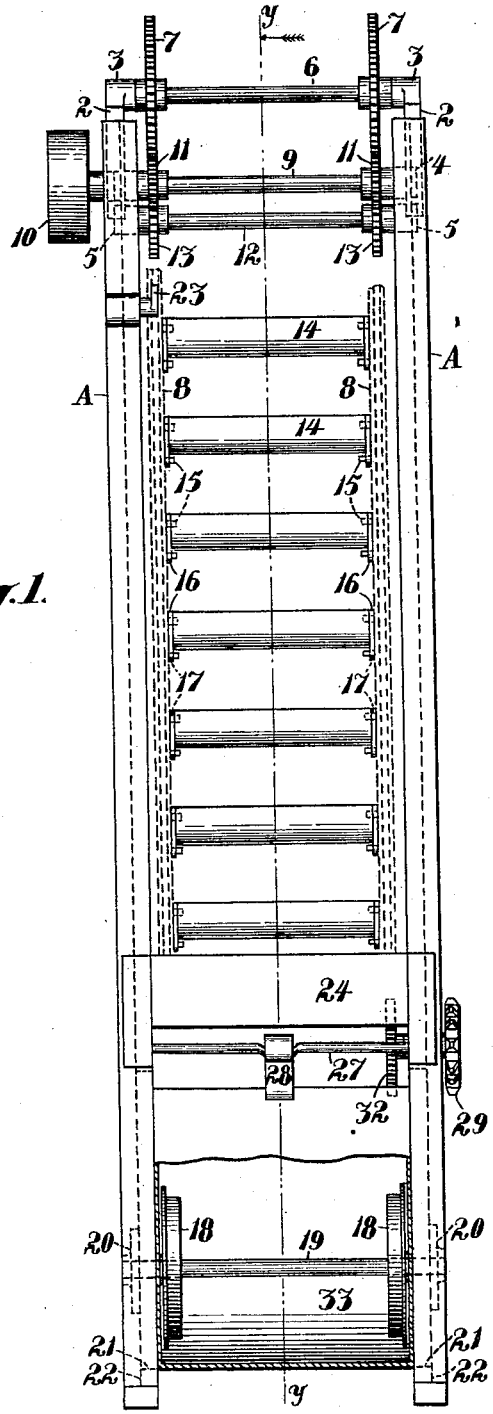
Figure 4:
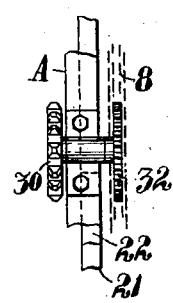
Figure 2:
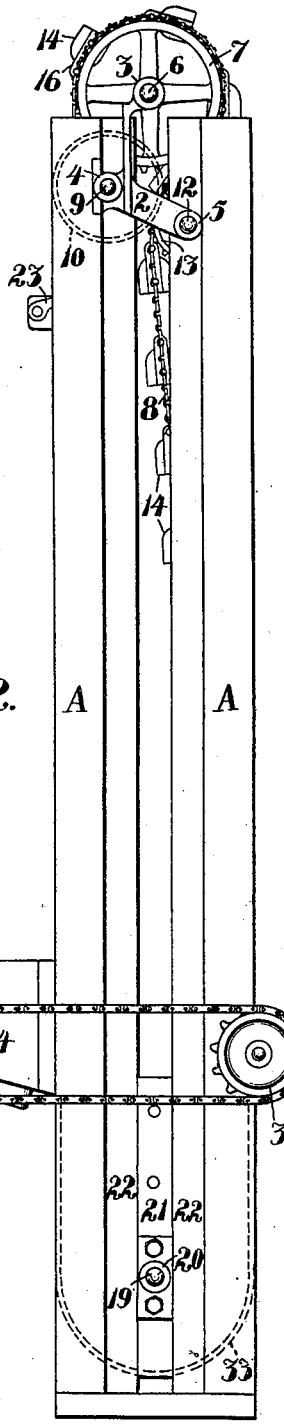
Figure 3:
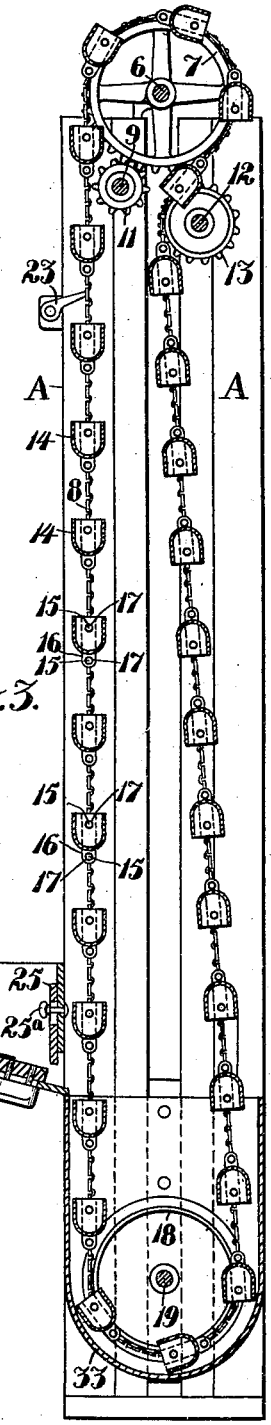

Figure 1 is a front elevation of my apparatus. Fig. 2 is a side elevation of same. Fig. 3 is a section on line *y y* of Fig. 1. Fig. 4 is a separate view of feed-driving device.

The object of this apparatus is to conveniently transport prunes or similar dried fruits from a hopper or receiver into which they may be delivered, and to elevate them to floors above where the final packing of the fruit may take place, and for similar or equivalent purposes.

As shown in the drawings, A A are the main elevator-posts, which are here shown as standing in vertical positions and sufficiently wide apart to allow the travel between them of the chain of elevator buckets to be hereinafter described. Upon the upper end of these posts are fixed iron hoods or brackets 2, which are so constructed as to carry the journal-boxes 3, 4, and 5. The upper journal-boxes 3 carry the shaft 6, near the ends of which are the toothed sprocket-wheels 7, over which the elevator-chains 8 are adapted to pass. The journal-boxes 4 carry the shaft 9, upon the outer end of which is fixed the driving-pulley 10, through which power is transmitted to the shaft and to the small gear or sprockets 11. The teeth of these gears or sprockets engage with the similarly-shaped teeth of the sprocket-wheels 7, over which the main chains pass, and thus by the revolution of the shaft 9 power is transmitted directly to drive the main sprockets 7 and the elevator-chains carried thereby. The boxes 5 of the bracket 2 carry the shaft 12. Upon the ends of this shaft are the idler sprocket-wheels 13. The shaft 12 and the idler-sprockets 13 are so located as to bring the chain back after it has passed vertically upward over the sprockets 7, thus returning the chains into the plane into which it is desired to have them descend. The chains are thus brought nearer together than the diameter of the sprocket-wheels 7.

The buckets 14 are connected with the chain as follows: Certain links of the chain are called "stud" links, and these links, which may be fourteen or fifteen inches apart or at such distance as the size of the buckets require, have pins 15 projecting inwardly from them. The ends of the buckets 14 are here shown with vertical stiffening-bars 16, having holes made in them, as at 17. One of these holes at each end enters the bucket near the upper part and the bottom hole passes through the stiffening-bar 16 just below the bottom of the bucket. This prevents the clogging of the fruit between the pins, which might otherwise occur if both pins entered the bucket ends. The chains 8 pass around idler drums or pulleys 18, fixed upon a shaft 19 at the lower part of their travel. This shaft is journaled in boxes, as at 20, and these boxes are carried by slides 21, movable between guides 22, which guides are mounted on the main posts A A, and by this freedom of movement the weight of the drums and shaft are sufficient to maintain the proper tension upon the chains 8 at all times. As the distance between the top and bottom of the travel of these endless chains is often as much as thirty feet or more, it will be seen that the elongation of the chains by wear becomes a serious matter, amounting to as much as several inches in the season, and this device of slides moving in the guides and carrying the lower drums serves to maintain a very perfect automatic adjustment.

The buckets are of considerable size, and when a line of loaded buckets is being carried upward there is considerable weight upon the vertical portion of the chain. I have therefore shown a brake which consists of pawls, as at 23, the pawls being pivoted to a support fixed upon one of the main guides A, and its point is adapted to engage the links of the chain, so that whenever the apparatus is stopped or there is any tendency to move backward these pawls hold the parts in place.

In order to supply the buckets with the fruit as they pass, I have shown a hopper or receiver 24, which may have a sliding gate 25 at the front and an oscillating or shaking bottom 26. This bottom may be oscillated by means of a cam mounted upon a shaft 27 and engaging with a slotted arm 28, which arm is secured to the slide. In order to operate this oscillating device, I have shown chain-pulleys 29 and 30 and an endless chain 31 passing around these pulleys. The shaft of the pulley 30 is journaled upon one of the vertical posts, and upon the inner end of this short shaft is a sprocket-wheel 32. This sprocket-wheel is in line with the traveling bucket-carrying chain 8 and so disposed that the chain as it moves engages the teeth of this sprocket, thus revolves it and transmits motion through the gears 29 30 and chain 31 to the cam-shaft which oscillates the bottom 26, as previously described.

When the buckets reach the lower part of their travel in returning, they enter a casing or boot which is rectangular and substantially similar in shape to the length and width of the buckets, so that the latter may travel within this boot or casing. This casing is shown at 33 and forms an inclosure through which the buckets pass as they rise, and it serves to catch any fruit which might otherwise escape over the edges of the buckets as they pass the feed-hopper. The casing prevents such fruit from falling to the bottom and insures its being eventually carried up to its destination. This casing or boot is secured to the slide 21, and is thus movable in unison with the automatic adjustment of the main carrying-chains, as previously described.

The particular construction of the feeding devices of the hopper 24 are as follows: The gate or feed-board 25 is slidable vertically in guides at the front of the hopper and is held at any desired point of adjustment by a clamping-screw 25ª. The reciprocating slide 26 is shown in the sectional view, Fig. 3, as slidable upon the inclined bottom 26ª, and a pin from the bar 28 passes up through a slot in the bottom 26ª and is fixed to the slide 26. The reciprocations of the bar 28 are thus communicated to the part 26, and as the fruit falls in front of this part it is pushed forward through the opening beneath the feed-board to fall into the passing buckets.

The rear of slide is beveled, so as to move more readily beneath the fruit on its return movement if it is exposed; but I prefer to fit a thin metal plate 26ᵇ above the slide, extending close to the sides of the hopper to prevent dirt from getting below and clogging the slide.

Having thus described my invention, what I claim, and desire to secure by Letters Patent, is—

1. A chain bucket elevator having the main posts or supports, a bracket fixed to the top of said supports, said bracket having three sets of journal-boxes, a shaft carrying the main sprocket-wheels journaled in the first set of boxes, a shaft with transmitting-pinions journaled in the second pair of boxes, and a shaft carrying idler-sprockets journaled in the third pair of boxes, said idler-pinions serving to return the chains into the plane of the downward movement.

2. The combination in a chain bucket elevator of main posts or supports, brackets fixed to the upper ends of said supports, three pairs of boxes rigidly secured and carried by said brackets and forming journal-supports for the main and idler sprocket-wheels over which the chain passes and over driving sprocket-pinions which are located substantially below the main sprockets, said pinions acting to support and drive the main sprockets.

3. An elevator comprising a pair of vertically-traveling endless chains, driving and supporting sprockets about which the upper bight of the chains pass, drums mounted on slidable guides and suspended in the lower bights of the chains, buckets having vertical strengthening-bars at the ends, said bars extending below the bottoms of the buckets and having holes formed in said extensions and also through the upper part of the buckets, links in the endless chain having inwardly-projecting studs, said studs engaging with the buckets and maintaining their upright position when loaded.

4. An endless chain of vertically-traveling buckets means for imparting motion thereto and maintaining the tension of the chains, a supply-hopper, movable bottom and cam-shaft and connections by which the bottom is oscillated, said connections comprising sprocket-wheels mounted upon a shaft, one of said sprockets engaging the main bucket-carrying chain, the other carrying one end of a short chain and a sprocket upon the cam-shaft about which the other end of said chain passes whereby motion is transmitted to move the hopper-bottom when the chain of buckets is in motion.

5. The combination with an endless chain of carrying-buckets, of an open-front hopper, a vertically slidable and adjustable controlling-gate therefor, and an inclined reciprocating bottom.

6. An endless chain of carrying-buckets, a feed-hopper located in front of the line of travel of said buckets, and having a vertically-adjustable gate or front, an inclined bottom, a slidable bottom movable thereon, and a reciprocating arm having connections with the slidable bottom.

In testimony whereof I have hereunto set my hand in presence of two subscribing witnesses.

HARVEY M. BARNGROVER.

Witnesses:
G. H. LISLE,
F. L. BURRELL.